United States Patent
Ichikawa

(10) Patent No.: US 9,277,135 B2
(45) Date of Patent: Mar. 1, 2016

(54) IMAGE-PICKUP APPARATUS, CONTROL METHOD FOR THE SAME, AND NON-TRANSITORY COMPUTER-READABLE STORAGE MEDIUM

(71) Applicant: CANON KABUSHIKI KAISHA, Tokyo (JP)

(72) Inventor: Shigeru Ichikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 31 days.

(21) Appl. No.: 13/927,587

(22) Filed: Jun. 26, 2013

(65) Prior Publication Data
US 2014/0016001 A1    Jan. 16, 2014

(30) Foreign Application Priority Data

Jul. 10, 2012   (JP) ................................. 2012-154213

(51) Int. Cl.
*H04N 5/235*    (2006.01)

(52) U.S. Cl.
CPC ........... *H04N 5/2353* (2013.01); *H04N 5/2352* (2013.01); *H04N 5/2355* (2013.01)

(58) Field of Classification Search
CPC ............ H04N 5/2356; H04N 5/35581; H04N 5/35536; H04N 5/35554; H04N 5/2353; H04N 5/2355; H04N 5/2352
See application file for complete search history.

(56) References Cited

U.S. PATENT DOCUMENTS

| | | | | |
|---|---|---|---|---|
| 2006/0104626 A1* | 5/2006 | Hisamitsu | ...................... | 396/164 |
| 2009/0086056 A1* | 4/2009 | Asoma | ........................ | 348/229.1 |
| 2009/0231465 A1* | 9/2009 | Senba | ......................... | 348/229.1 |
| 2010/0066858 A1* | 3/2010 | Asoma | ........................ | 348/229.1 |

FOREIGN PATENT DOCUMENTS

JP    06-141229 A    5/1994

* cited by examiner

*Primary Examiner* — Jason Flohre
(74) *Attorney, Agent, or Firm* — Cowan, Liebowitz & Latman, P.C.

(57) ABSTRACT

An image-pickup apparatus includes an exposure condition calculator configured to calculate an exposure condition of an image sensor determined by accumulation time of the image sensor, an amplification amount and an aperture value of an image signal, and an image generator configured to generate a high dynamic range image. When the plurality of exposure conditions have equal exposure differences, the exposure condition calculator changes the accumulation time so as to follow a change of the object brightness from a first value to a second value, and the exposure condition calculator calculates the plurality of exposure conditions by fixing the accumulation time and by changing the amplification amount so as to follow a change of the object brightness from a third value smaller than the first value to a fourth value smaller than the second value.

9 Claims, 9 Drawing Sheets

IMAGE-PICKUP APPARATUS, CONTROL METHOD FOR THE SAME, AND NON-TRANSITORY COMPUTER-READABLE STORAGE MEDIUM

BACKGROUND OF THE INVENTION

1. Field of the Invention

The present invention relates to an image-pickup apparatuses, such as a digital camera and a video camera, configured to capture a motion image.

2. Description of the Related Art

It is known that a dynamic range (which is a ratio between the minimum brightness and the maximum brightness by which the gradation can be identified) of a solid-state image sensor, such as a CCD or CMOS image sensor is generally narrower than that of the human eye (FIG. 10).

It is thus difficult to reproduce the gradation actually perceived by the human eye in a picture. One known solution for this problem is a method for superimposing a plurality of images captured with different exposure conditions (such as an H image of a bright overexposure, an M image of a proper exposure, and an L image of a dark underexposure) for a high dynamic range ("HDR" hereinafter) wider than usual imaging (see, for example, Japanese Patent Laid-Open No. ("JP") H06-141229).

FIG. 11 illustrates one illustrative photography for the HDR disclosed in JP H06-141229. A plurality of images (which are three images containing an H image, an M image, and an L image) are captured with different exposure conditions after the photography starts. Then, these images are synthesized for the HDR that contains an exposure difference between the H image and the L image.

JP H06-141229 discloses a method for creating an exposure difference utilizing the exposure time period. Hence, this method is unsuitable for the motion image photography in which an image is captured for each predetermined period (such as 30 fps) which means that 30 images are captured per second.

SUMMARY OF THE INVENTION

The present invention provides an image-pickup apparatus configured to realize a high dynamic range ("HDR") in motion image photography, and to maintain the HDR even when the object brightness changes.

An image-pickup apparatus according to the present invention includes an image sensor configured to generate an image signal by photoelectrically convert an object image formed by a lens at a predetermined cycle, an accumulation time controller configured to control accumulation time of the image sensor, an amplifier configured to amplify an image signal generated by the image sensor, an object brightness calculator configured to calculate an object brightness based upon the image signal generated by the image sensor, an exposure condition calculator configured to calculate an exposure condition of the image sensor which is determined by the accumulation time of the image sensor, an amplification amount and an aperture value of the image signal, based upon the object brightness calculated by the object brightness calculator, and an image generator configured to synthesize a plurality of synthesis images continuously captured with a plurality of different exposure conditions, and to generate a synthesized image in which a dynamic range is expanded. When the plurality of exposure conditions have equal exposure differences, the exposure condition calculator changes the accumulation time so as to follow a change of the object brightness from a first value to a second value. The exposure condition calculator calculates the plurality of exposure conditions by fixing the accumulation time and by changing the amplification amount so as to follow a change of the object brightness from a third value smaller than the first value to a fourth value smaller than the second value.

Further features of the present invention will become apparent from the following description of exemplary embodiments with reference to the attached drawings.

DESCRIPTION OF THE EMBODIMENTS

Figure 1:
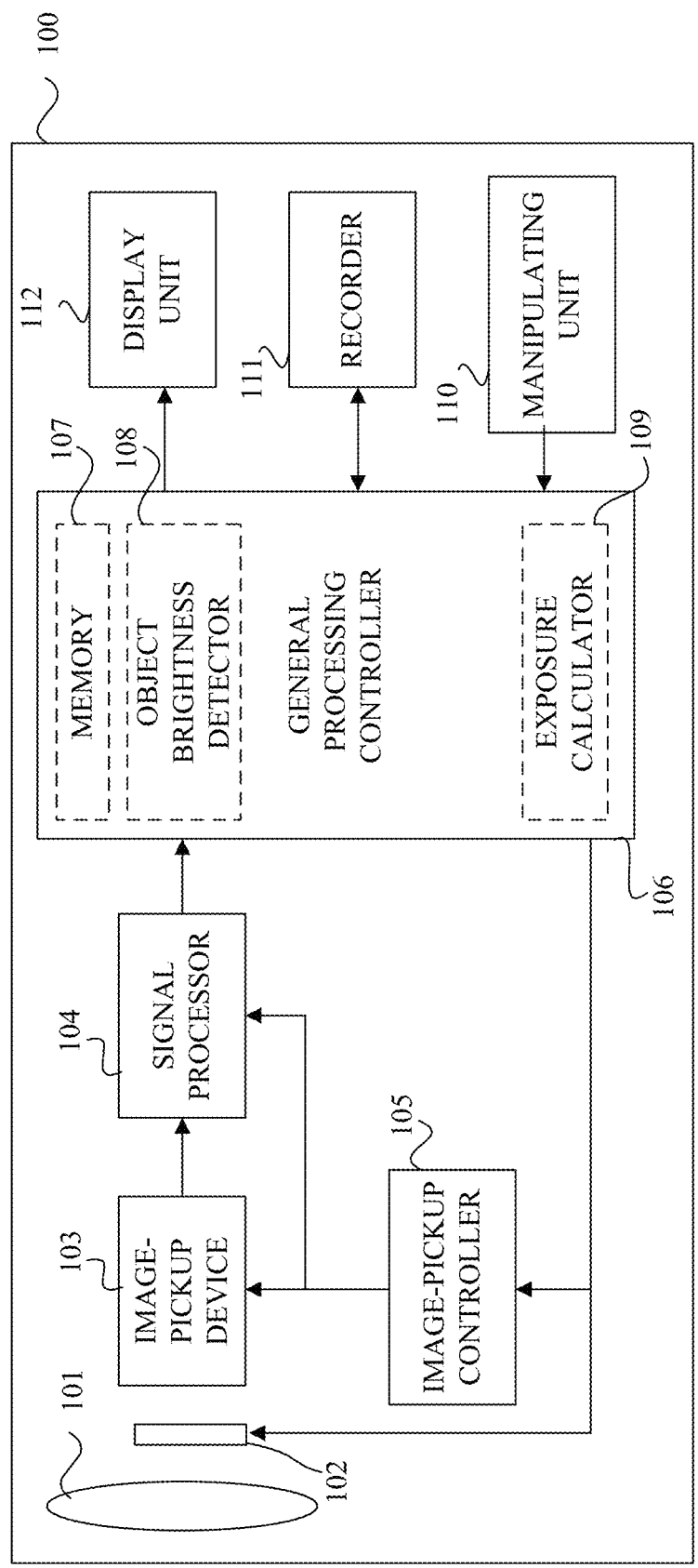
FIG. 1 is a block diagram of a configuration of an image-pickup apparatus according to an embodiment of the present invention.

A description will now be given of embodiments according to the present invention with reference to the accompanying drawings. FIG. 1 is a block diagram of a configuration of an image-pickup apparatus according to an embodiment of the present invention.

First Embodiment

Reference numeral 100 denotes an image-pickup apparatus, such as a digital camera and a video camera, configured to capture a motion image, and it is the digital camera in this embodiment.

When internal functions of the image-pickup apparatus 100 are described, reference numeral 101 denotes a lens configured to converge light from an object to an image-pickup device 103. The lens 101 includes a focus lens (focal length changer) and a diaphragm (light shield) configured to shield incident light.

Reference numeral 102 denotes a light amount adjuster (light attenuator) configured to adjust a light amount that passes the lens 101 arranged between the lens 101 and the image-pickup device 103. More specifically, in this embodiment, it is an ND filter inserting mechanism that can attenuate a light amount by three stages. While this embodiment utilizes the three-stage ND filter inserting mechanism, another light attenuating value other than the three stages may be used and gradual light attenuations utilizing a diaphragm mechanism may be available.

Reference numeral 103 denotes an image-pickup device (image sensor), which includes a pixel unit configured to convert incident light through the lens 101 and the light amount adjuster 102 into an analogue electric signal, an A/D converter configured to convert the analogue signal output from the pixel part into a digital signal (image signal), etc. The pixel unit contains a photoelectric conversion element configured to photoelectrically convert an object image formed through the lens 101 and the light amount adjuster 102.

Reference numeral 104 denotes a signal processor (amplifier), configured to perform necessary image-signal corrective processing for a pixel signal (image signal) input from the image-pickup device 103. For example, the signal processor 104 amplifies the image signal input from the image-pickup device 103.

Reference numeral 105 denotes an image-pickup controller (accumulation time controller), configured to generate a necessary timing signal for the image-pickup device 103, the signal processor 104, etc., based upon an input signal from a general processing controller 106, which will be described later. The image-pickup controller 105 generates a gain setting signal used to amplify an image signal necessary for the signal processor 104, an exposure time (accumulation time) setting signal necessary for the image-pickup device 103, and a signal necessary for another control based upon the input signal from the general processing controller 106, which will be described later. The image-pickup controller 105 controls the exposure time of the image-pickup device 103 utilizing the generated exposure time setting signal.

Reference numeral 106 denotes a general processing controller (exposure condition calculator or image generator), and provides general control over the image-pickup apparatus 100. The general processing controller 106 provides necessary processing and calculations according to the operation of image-pickup apparatus 100. The general processing controller 106 synthesizes a plurality of synthetic images continuously captured with different exposure conditions in the motion image photography, and generates a high dynamic range synthetic image ("HDR image" or "synthesized image in which a dynamic range is expanded, hereinafter), as described later. The general processing controller 106 sets exposure for the captured image according to the object brightness detected by an object brightness detector 108, which will be described later.

The general processing controller 106 includes a memory 107 configured to temporarily store the signal from the signal processor 104, etc., an object brightness detector (object brightness calculator) 108 configured to detect (calculate) a brightness value of the captured object based upon the signal from the image-pickup device 103. The general processing controller 106 further includes an exposure calculator 109 configured to determine the exposure for the captured image based upon the signal from the object brightness detector 108. The general processing controller 106 adjusts the gain by using the light amount adjuster 102 based upon the calculation result of the exposure calculator 109, or adjusts the exposure time and the gain used to amplify the image signal by using the image-pickup controller 105. While this embodiment independently provides the signal processor 104 separately from the general processing controller 106, the signal processor 104 may be part of the general processing calculator 106.

Reference numeral 110 denotes a manipulating unit, including a human interface, such as a button and a dial, configured to input an operational instruction of the image-pickup apparatus 100.

Reference numeral 111 denotes a recorder, configured to record image data generated by the general processing controller 106.

Reference numeral 112 denotes a display unit configured to display image data generated by the general processing controller 106 based upon the signal from the signal processor 104, and an icon etc. corresponding to a manipulation input from the manipulating unit 110.

A description will now be given of a method for obtaining an HDR image by using the image-pickup apparatus 100 illustrated in FIG. 1.

Figure 2:
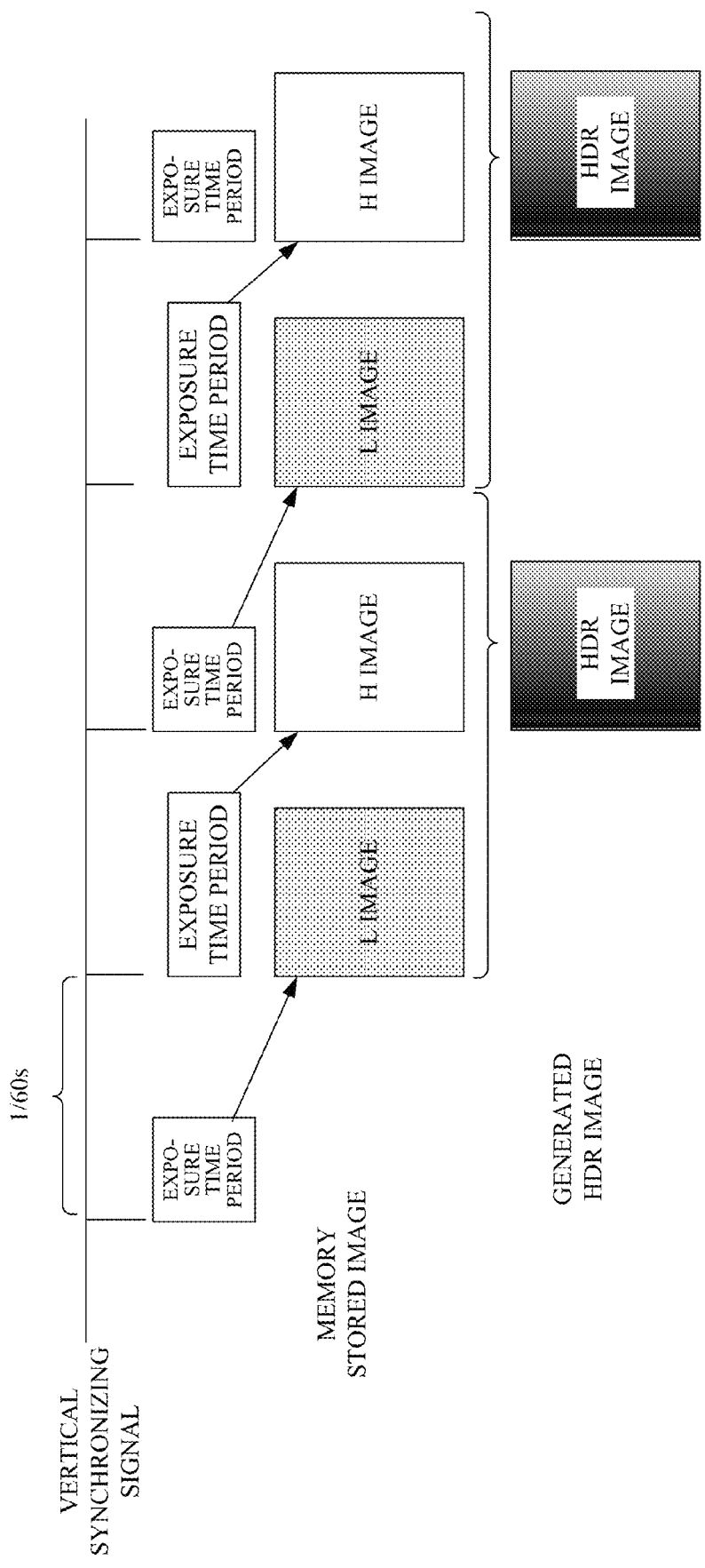
FIG. 2 is a timing chart of a photography according to the embodiment of the present invention.

FIG. 2 is a timing chart in obtaining the HDR image by using the image-pickup apparatus 100 according to this embodiment.

A motion image is captured at a capturing cycle of 60 fps in synchronization with a vertical synchronizing signal for each 1/60 s generated by the general processing controller 106. This embodiment alternate the exposure for the L image and the exposure for the H image (a plurality of synthesis images) on the condition (such as different exposure time) set by the image-pickup controller 105. Captured images are temporarily stored in the memory 107, and the general processing controller 106 synthesizes a pair of L and H images into the HDR image.

A description will now be given of the way of following a change of the object brightness.

Figure 3:
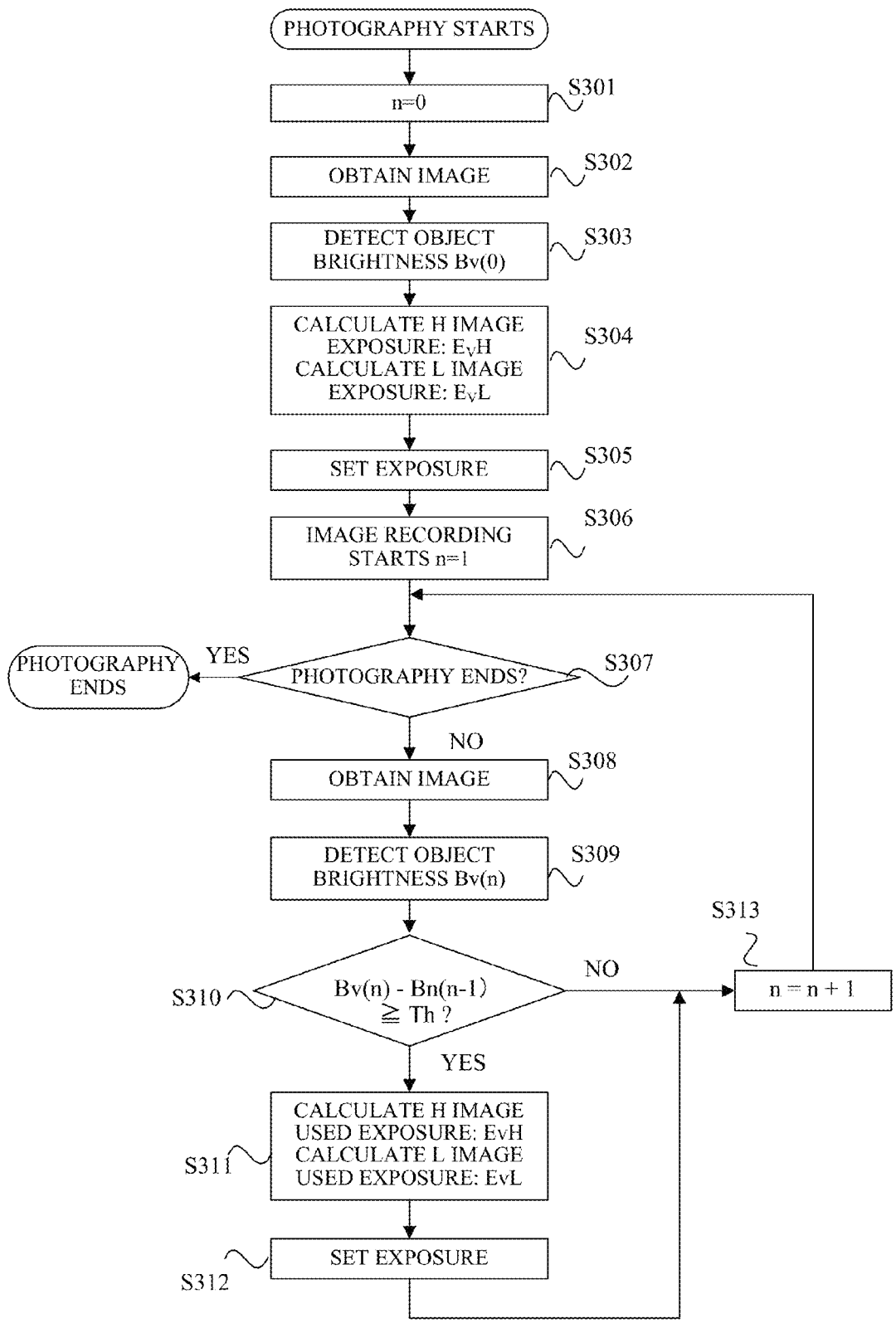
FIG. 3 is a flowchart of a photography according to the embodiment of the present invention.

FIG. 3 is a flowchart of the way of following a change of the object brightness in capturing the HDR image according to this embodiment. The general processing controller 106 mainly executes this processing in accordance with a computer program. This similarly applies to other embodiments, which will be described later.

Initially, a preparatory operation before the photography starts will be illustrated. After the photography starts by the instruction from the manipulation unit 110 etc., a counter "n" is reset to 0 (S301). When the counter "n" is reset to 0 in S301, then an image used to calculate the exposure when the photography starts is acquired (S302). The object brightness Bv(0) is detected by the object brightness detector 108 based upon the image captured in S302 (S303). The exposure calculator 109 calculates the H image exposure ("EvH" hereafter) and the L image exposure ("EvL" hereafter) based upon the object brightness Bv(0) detected in S303 (S304). After the light amount adjuster 102 and the image-pickup controller 105 are set based upon the calculated exposure condition (EvH and EvL) (S305), the counter "n" is set to 1 and image recording is started (S306).

The above steps S301-S306 are operations executed before the HDR image is acquired, and only one image may be captured. The steps S302-S304 may be omitted if the photography starts with the predetermined exposure condition.

Next, it is determined whether the photography has ended by the instruction from manipulation unit 110 etc. (S307). The procedure ends when it is determined that the photography has ended (Yes of S307), and the next image to be captured is obtained (S308) on the basis of the exposure condition set in S305 when the photography has not yet ended (No of S307).

A description will now be given of a following action to a change of the object brightness Bv(n). The object brightness Bv(n) is detected for the sequentially obtained synthesis images (L and H images) similar to the operation of S303 (S309). It is determined whether there is a difference of prescribed threshold Th or higher between detected Bv(n) and previously obtained Bv(n−1) (S310). When there is a difference of threshold Th or higher, EvH and EvL are calculated similar to S304 (S311), the light amount adjuster 102 and image-pickup controller 105 are set (or reset) (S312). Next, the counter is incremented by +1 (S313), the flow returns to S307, and it is again determined whether the photography has ended. When the difference is lower than the threshold Th, the flow moves to S313 without S311 or S312, the counter "n" is incremented by +1, and the flow returns to S307. This operation continues until the photography ends so as to follow a change of the object brightness while the HDR image is being captured.

This embodiment detects the object brightness Bv(n) every shot but may detect it every plural shots or may compare it with previously obtained reference exposures calculated based upon a plurality of previously detected images in addition to Bv(n−1).

Figure 4:
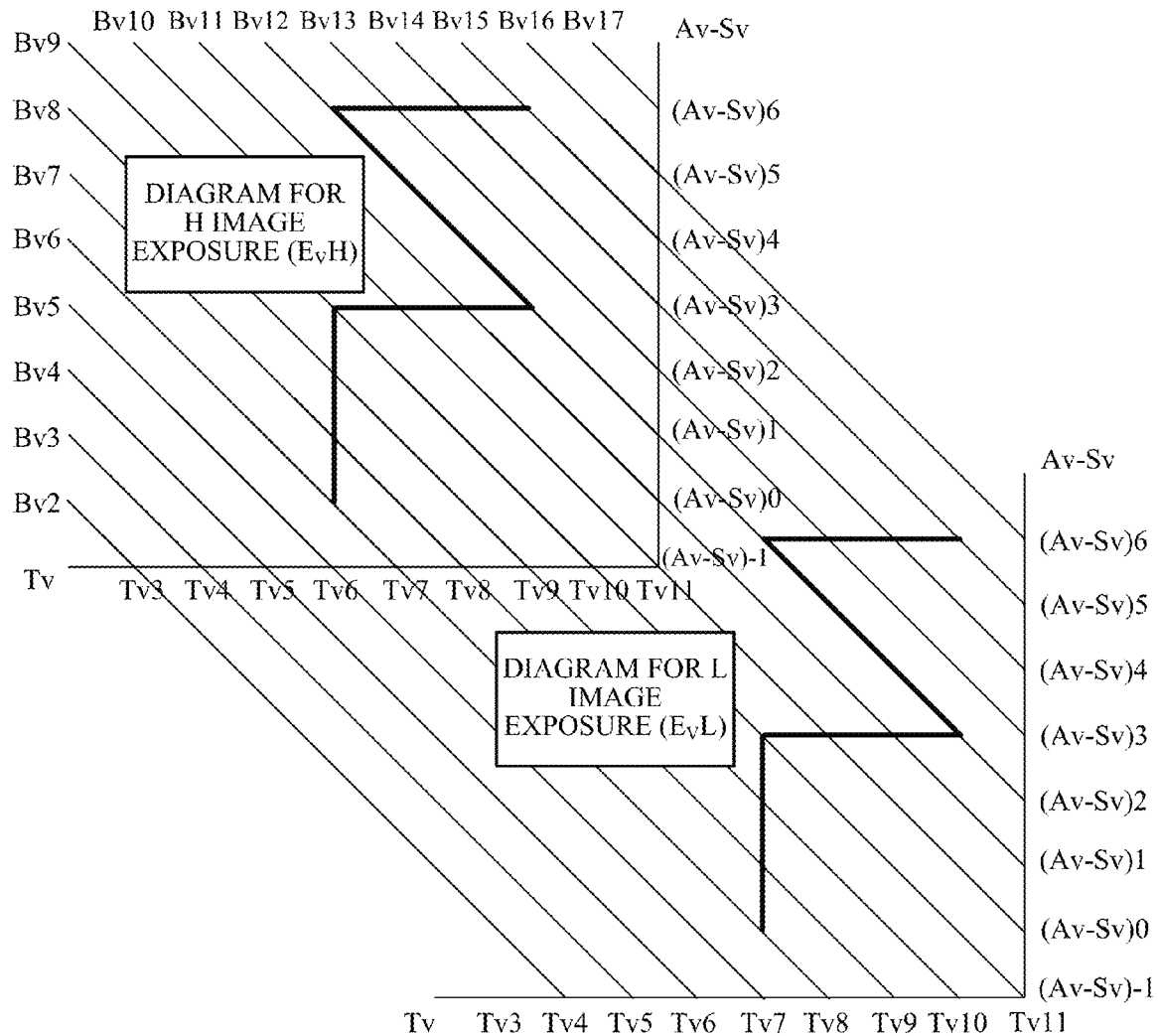
FIG. 4 is a program diagram when the image-pickup apparatus obtains an HDR image according to a first embodiment.

A description will now be given of exposure setting according to each object brightness. FIG. 4 is a program diagram used for S304 and S311 in the flowchart of FIG. 3 to calculate EvH and EvL. The upper left program diagram is a diagram ("EvH diagram" hereinafter) used to calculate the exposure used to capture the H image (EvH) which is higher than proper exposure, and the lower right program diagram is a diagram ("EvL diagram" hereinafter) used to calculate the exposure used to capture the L image (EvL) which is lower than the proper exposure. In each diagram, the abscissa axis denotes exposure time Tv, and the ordinate axis denotes a difference between a light adjusting amount Av in the light amount adjuster 102 and a gain setting amount (amplification amount) Sv used to amplify the image signal in the signal processor 104. The oblique line illustrates the same object brightness By in the EvH and EvL diagrams. In other words, the exposure condition at the intersection in each program diagram becomes EvH and EvL for the oblique line of the object brightness By detected by the object brightness detector 108.

Referring now to FIG. 4, a description will be given of a specific method for following a change of the object brightness while the HDR image is being captured by the image-pickup apparatus 100 according to this embodiment. This embodiment selects a Tv value (accumulation time) for EvL which is always higher than EvH by one level from Bv15 to Bv6. From Bv15 to Bv12, the object brightness is followed by changing the Tv values for both EvL and EvH. At Bv12, the ND filter of the light amount adjuster 102 is removed at the same timing for EvL and EvH and the Tv value is simultaneously increased by three levels. From Bv12 to Bv9, similar to Bv15 to Bv12, the Tv values are changed so as to follow the object brightness. In other words, in the range of the object brightness from Bv15 to Bv12 and Bv12 to Bv9, each Tv value is changed so as to follow a change of the object brightness from the first value to the second value. The image-pickup controller 105 generates a gain setting signal used to amplify the image signal at Bv9 (threshold) in which the EvH exposure cannot be followed by lowering the corresponding Tv value (or when the value reaches the settable upper limit of the Tv value for EvH in the motion image photography). This embodiment sets the same gain setting amount for EvL and EvH so as to follow a change from Bv9 to Bv6 by increasing the amplification amount Sv value by the maximum three levels (upper limit value) while maintaining (or fixing) the Tv values for EvH and EvL at Bv9. In other words, for a change from Bv9 to Bv6, the Tv value for EvH is maintained to be Tv6, the Tv value for EvL is maintained to be Tv7, and the Sv value is increased up to the upper limit value. Each Sv value is changed in this object brightness range in following a change of the object brightness from the third value to the fourth value. In the dark object brightness range from Bv9 to Bv6, the Tv value for EvL is maintained to be Tv7 and the gain is adjusted so as to follow the change, and this method is suitable for the quickly moving object. In following a change from Bv6 to Bv15, one level difference in the Tv value is always maintained between EvL and EvH, and the setting of the light amount adjuster 102 are always the same between EvL and EvH and the Sv value setting is always the same between EvL and EvH. Therefore, in following the change of the object brightness from Bv6 to Bv15, an exposure difference between EvL and EvH is maintained constant.

While the above illustration changes the Sv value after the Tv value is changed up to the limit value, the changing order may be reversed and the Sv value may be changed after the Tv value is changed by a predetermined amount.

When the operation of this embodiment is used to follow a change of the object brightness from Bv6 to Bv15, an exposure difference can be maintained constant between EvH and EvL. In other words, the capturing exposure can be significantly changed while the exposure difference is maintained constant even when the object brightness significantly changes. An HDR image can be obtained at a desired output level while the HDR is maintained.

Figure 5:
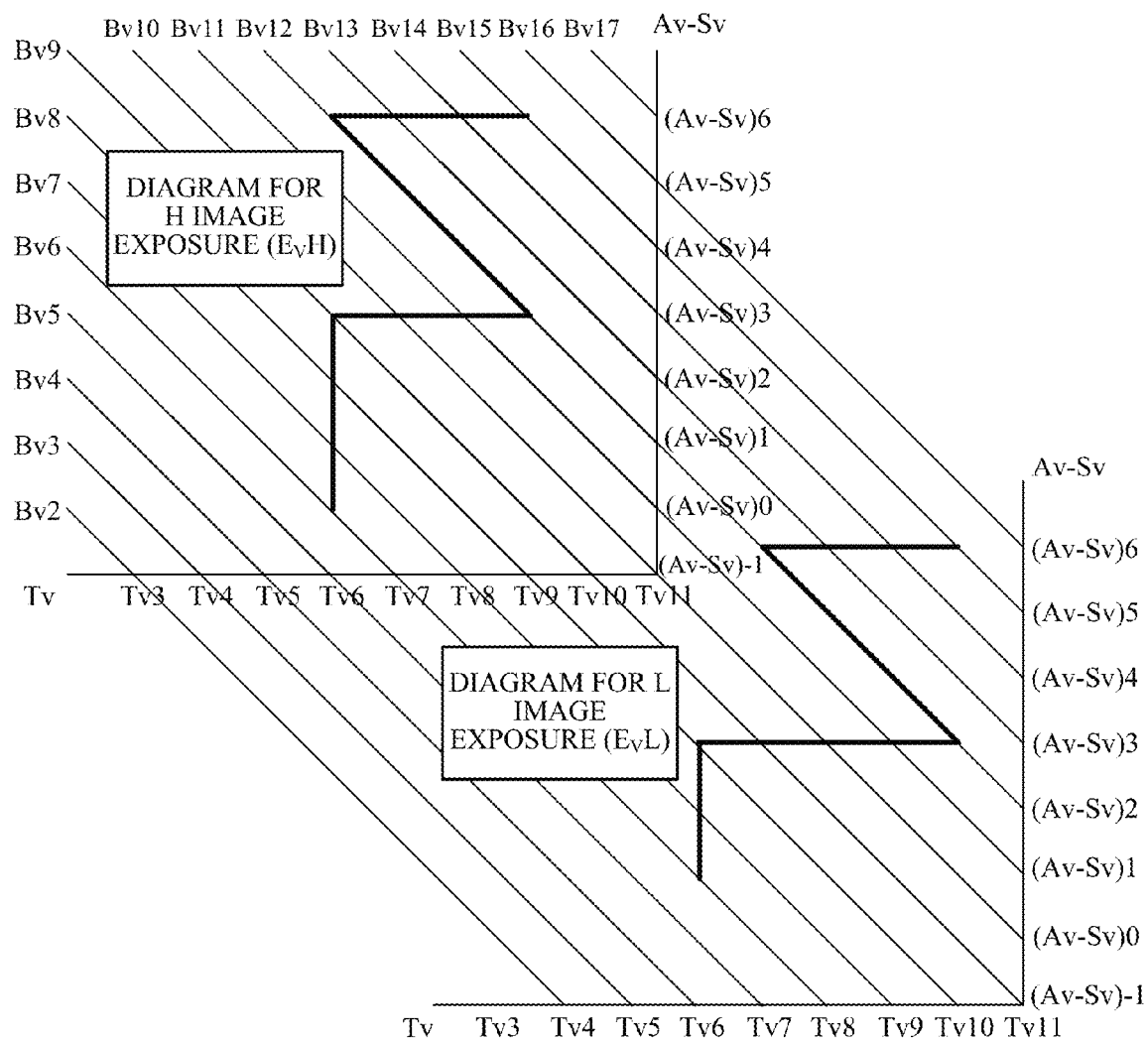
FIG. 5 is a program diagram when an image-pickup apparatus obtains an HDR image according to a variation of the first embodiment.

Referring now to FIG. 5, a description will be given of a variation of the embodiment illustrated in FIG. 4. This variation changes the Tv values for both EvL and EvH so as to follow the object brightness from Bv15 to Bv12. The Tv value for EvL is always higher than the Tv value for EvH. At Bv12, the ND filter of the light amount adjuster 102 is removed at the same timing for EvH and EvL, and the Tv value is simultaneously increased by three levels. A Tv value is changed so as to follow a change of the object brightness from Bv12 to Bv9, similar to Bv12 from Bv15. At Bv9 (threshold), the EvH exposure cannot be followed by lowering the Tv value (or the value reaches the settable upper limit value of the Tv value for EvH). Then, the image-pickup controller 105 generates a gain setting signal used to amplify the image signal. This variation provides different values to the gain setting for EvL and EvH by a value corresponding to a difference of one level. The exposure for EvH follows a change from Bv9 to Bv6 by increasing the amplification amount Sv value by the maximum three levels (upper limit value) while the Tv value is maintained to be Tv6. Since the Tv value for the EvL exposure can be lowered by one level at Bv9, the Tv value is reduced until the object brightness reaches Bv8. At Bv8, the EvL exposure cannot be followed only by lowering the Tv value. Then, the amplification amount Sv value is increased by two levels so as to follow a change from Bv8 to Bv6. A gain amount set to EvL is smaller than that of EvH by one level. In other words, while one level difference in gain amount is maintained between EvL and EvH, a change down to Bv6 is followed. The EvL gain setting amount Sv can be smaller than the EvL gain setting amount Sv illustrated in FIG. 4 in the dark object brightness range from Bv9 to Bv6, and it is advantageous to noises (image quality). Even this embodiment can maintain constant an exposure difference between EvL and EvH utilizing the above operation. Therefore, a change of the object brightness from Bv6 to Bv15 can be followed while the exposure difference between EvL and EvH can be maintained constant.

This variation changes the Sv value after changing the Tv value to the limit value, but the changing order may be reversed or the Sv value may be changed after the Tv value is changed by a predetermined value.

The operation of this variation enables the change of the object brightness from Bv6 to Bv15 to be followed, while the exposure difference between EvH and EvL is maintained constant. In other words, even when the object brightness significantly changes, the exposure for the image pickup can be significantly changed while the exposure difference is maintained constant. The HDR image at a desired output level can be obtained while the HDR is maintained.

The first embodiment produces a motion image of 30 fps using two types of images captured at 60 fps, but a frame rate may be equal to or smaller than 30 fps.

The exposure time difference between EvH and EvL may be a value other than one level so as to obtain a similar effect with the operation of this embodiment.

The H image may be first obtained among the L image and the H image illustrated in FIG. 2.

The change of the object brightness can be followed by three images or more for the HDR image while the exposure difference is maintained constant by utilizing the operation of this embodiment.

Second Embodiment

The first embodiment follows a change of the object brightness while maintaining a constant exposure difference.

When the HDR image is not obtained in the motion image photography, the TV value can be changed down to Tv5 in following the change whereas the TV value can be changed down to Tv6 at most when the HDR image is obtained. Thus, the object brightness lower than that of the normal capturing cannot be followed.

The configuration of the image-pickup apparatus in this embodiment and the operation necessary to acquire the HDR image other than the operation for capturing the low brightness object is similar to those of the first embodiment. In other words, the operation other than the operation for capturing the low brightness object less than Bv6 is basically similar to the operation illustrated in the first embodiment. The following description relates to a method for realizing the HDR in capturing a low brightness object.

Figure 6:
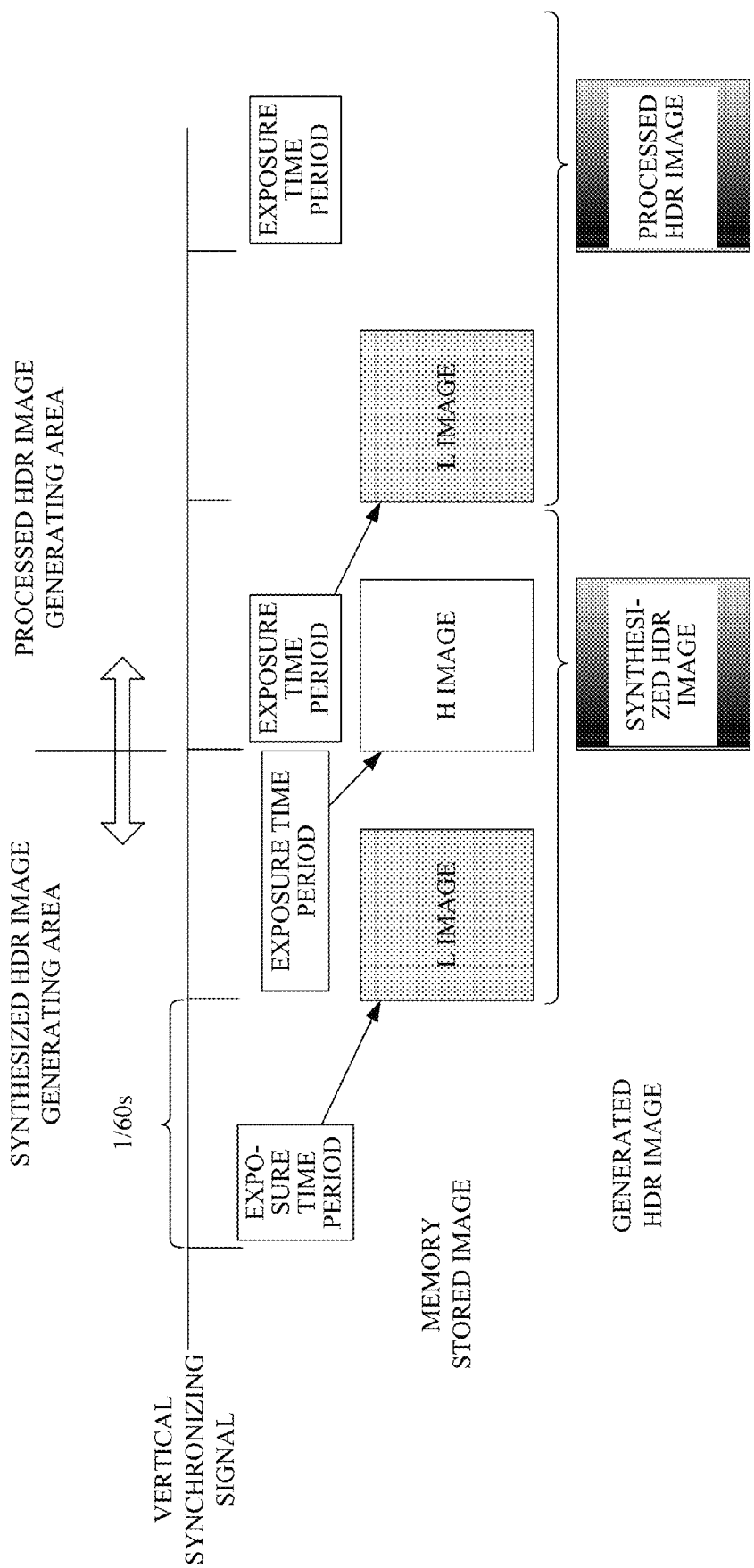
FIG. 6 is a timing chart of a photography according to a second embodiment of the present invention.

FIG. 6 is a timing chart in realizing the HDR from the low object brightness using the image-pickup apparatus 100 according to this embodiment.

Figure 7:
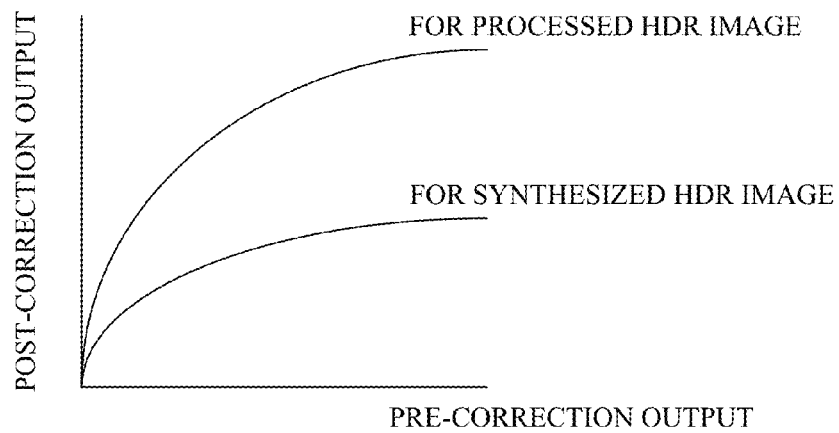
FIG. 7 is a graph of a gain amount when an image is processed according to the second embodiment.

The operation similar to the first embodiment is applied to the object having the predetermined brightness, and the HDR image is generated. In other words, the operation similar to the first embodiment is applied to the object brightness of Bv6 or higher, and the HDR image is generated. On the other hand, when the object brightness detector 108 detects the object brightness below the predetermined brightness value, the H image exposure is stopped and only the L image exposure is performed. When the object brightness becomes the predetermined brightness value (Bv6), both the settable Tv and Sv values for EvH have already reached the upper limit values in the motion image photography in obtaining the H image. Thus, this embodiment stops obtaining the H image and obtains only the L image when the object brightness becomes less than the predetermined brightness value. The acquired L image is multiplied by a processed HDR image gain (coefficient) illustrated in FIG. 7 in the image processing in the general processing controller 106. The processed HDR image gain is different according to an output value of each pixel, and more effectively emphasizes a signal having a high brightness than a gain for the normal HDR image. Even if no H image is obtained, if the L image is multiplied by the above gain, the HDR can be realized even in capturing the low brightness object.

Figure 8:
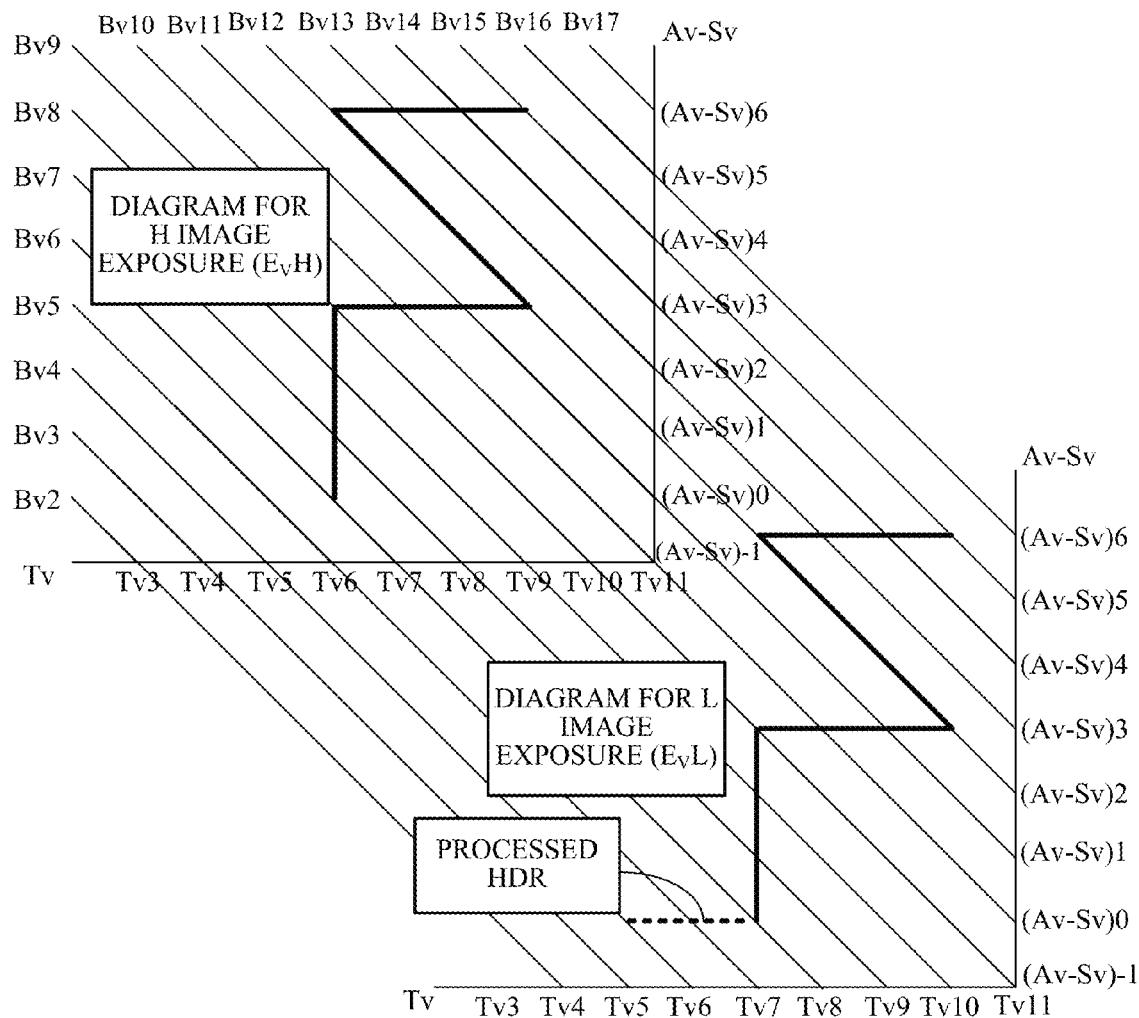
FIG. 8 is a program diagram when an image-pickup apparatus according to the second embodiment obtains an HDR image.

A description will be given of a more specific exposure setting according to this embodiment with reference to the diagram illustrated in FIG. 8.

The operation for following a change of the object brightness from Bv6 to Bv15 while the exposure difference between EvH and EvL is maintained constant is similar to FIG. 4 in the first embodiment. This embodiment stops acquiring the H image as illustrated by a dotted line in the diagram, for an object brightness lower than Bv6 according to one of the characteristics to this embodiment, and changes the Tv value of the exposure condition of the L image so as to follow the change from Bv6 to Bv4. The acquired image is multiplied by the above processed HDR image gain, and the HDR image is generated.

Thus, the object brightness of Bv4 lower than Bv6 can be followed by using the operation of this embodiment while the HDR is maintained. In other words, even when the object brightness significantly changes, the exposure in the image pickup can be significantly changed by maintaining constant the exposure difference. The HDR image at a desired output level can be obtained while the HDR is maintained.

Figure 9:
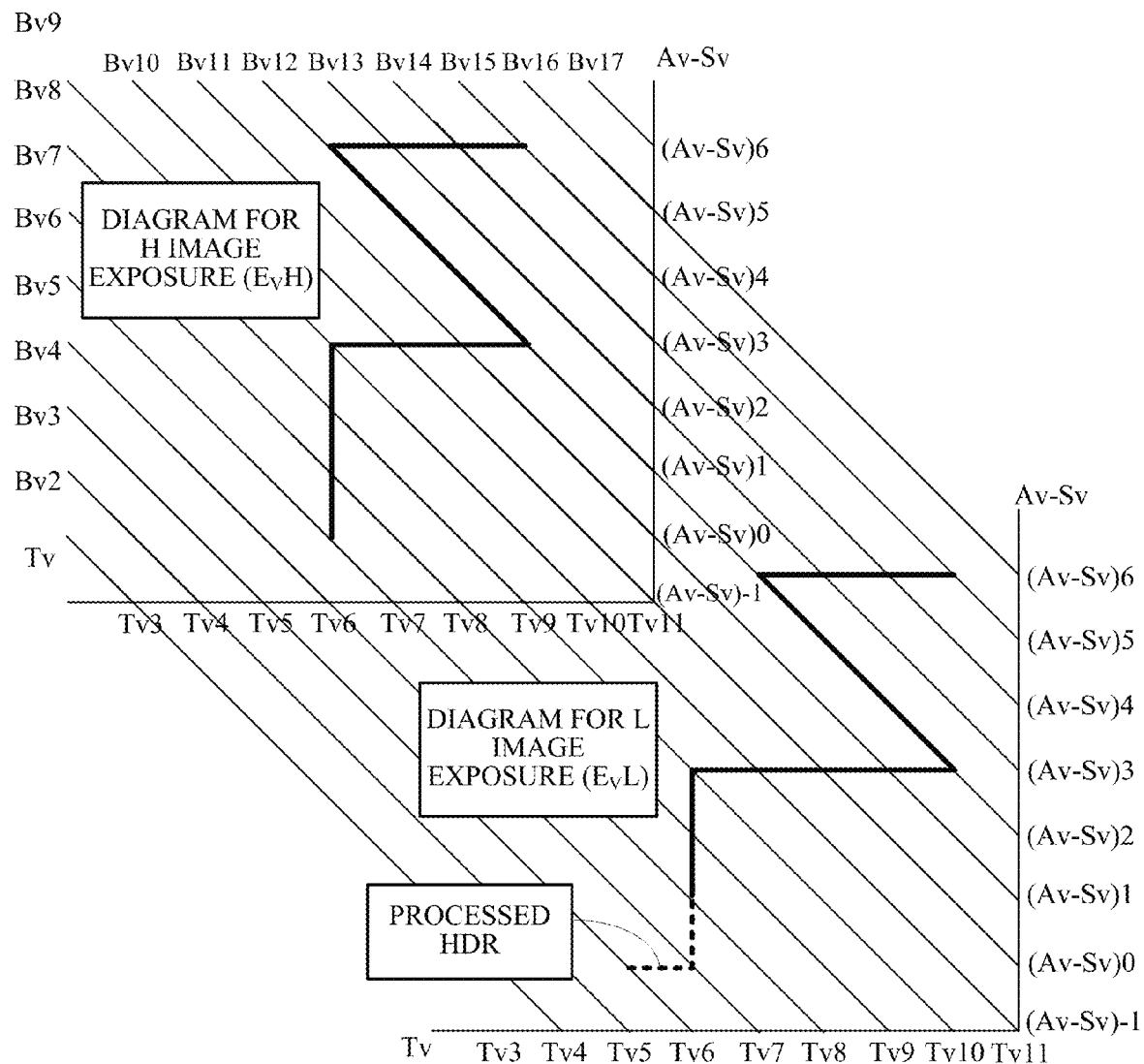
FIG. 9 is a program diagram when an image-pickup apparatus obtains an HDR image according to a variation of the second embodiment.
Figure 10:
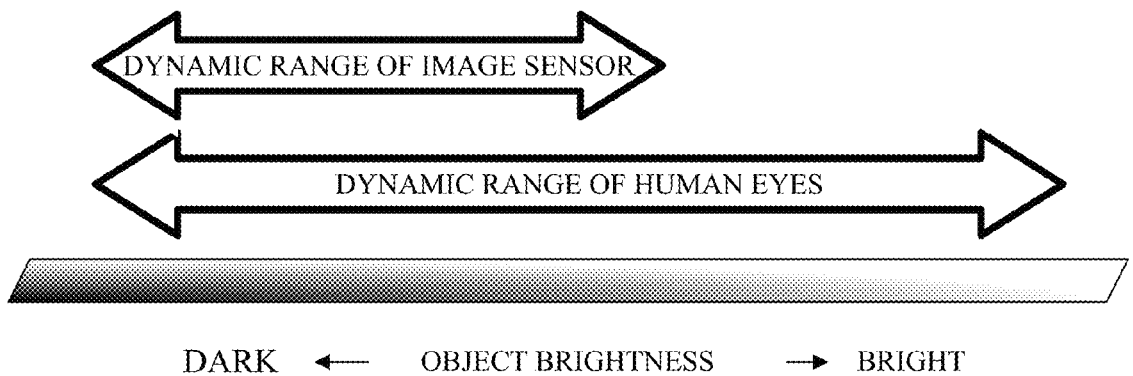
FIG. 10 is an explanatory view of a dynamic range.
Figure 11:
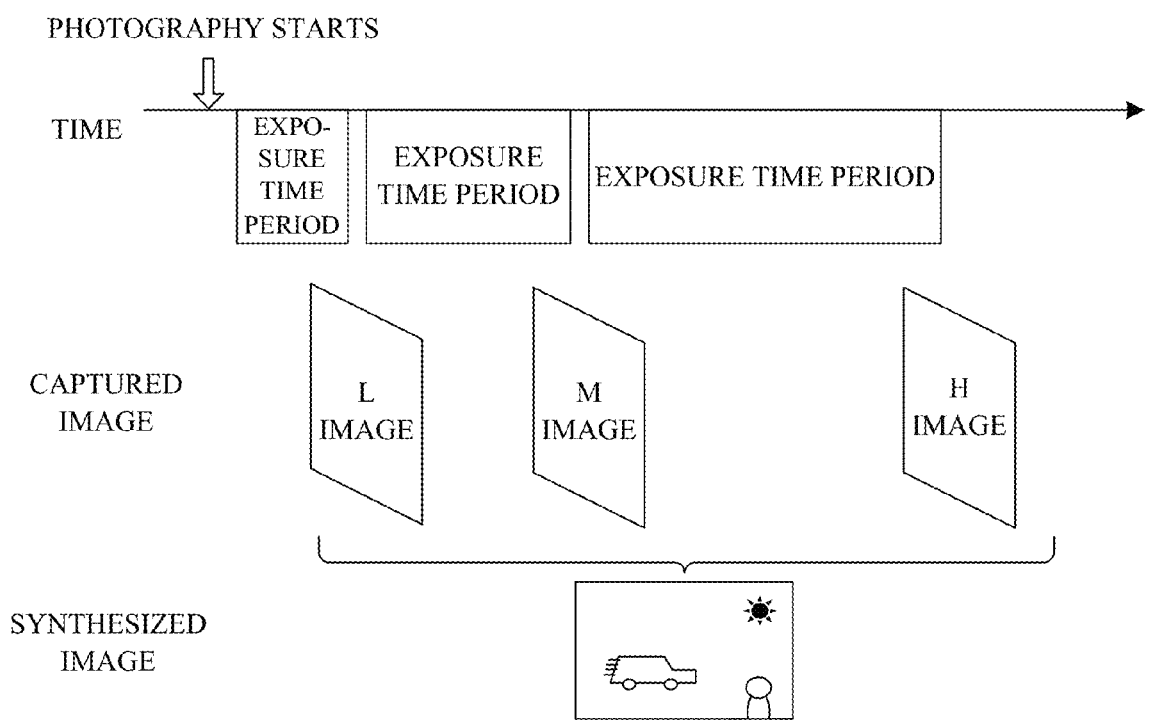
FIG. 11 is a schematic view of a conventional HDR image capturing method.

Referring now to a diagram of FIG. 9, a description will be given of a variation of the embodiment illustrated in FIG. 8.

The operation for following a change of the object brightness from Bv6 to Bv15 while the exposure difference is maintained constant between EvH and EvL is similar to FIG. 5 of the first embodiment. This embodiment stops acquiring the H image as illustrated by a dotted line in the diagram and changes the Sv and Tv values in the exposure condition of the L image so as to follow an object having brightness lower than Bv6 according to one of the characteristics to this embodiment. More specifically, the Sv value is changed to follow the change from Bv6 to Bv5, and the Tv value is changed to follow the change from Bv5 to Bv4. The acquired image is multiplied by the processed HDR image gain, and the HDR image is generated.

Thus, the object brightness of Bv4 lower than Bv6 can be followed by using the operation of this embodiment while the HDR is maintained. In other words, even when the object brightness significantly changes, the exposure in the image pickup can be significantly changed by maintaining constant the exposure difference. The HDR image at a desired output level can be obtained while the HDR is maintained.

The present invention can realize the HDR in the motion image photography, and maintain the HDR even when the object brightness changes.

The present invention is applicable to an image-pickup apparatus, such as a digital camera and a video camera, configured to generate an HDR image in the motion image photography.

Another Embodiment

The present invention provides another embodiment in which a non-transitory computer readable storage medium that stores a program code for software that describes the procedure used to realize a function of each of the above embodiments is supplied to a system or apparatus, and a computer (or a CPU, a MPU, etc.) of that system reads out the program code stored in the storage medium.

The program code itself read out of the storage medium will implement a novel function of the present invention, and the storage medium that stores the program code and the program compose the present invention.

The storage medium used to supply the program code includes, but is not limited to, a flexible disk, a hard disk, an optical disk, and a magnet-optical disk, a CD-ROM, a CD-R, a CD-RW, a DVD-ROM, a DVD-RAM, a DVD-RW, a DVD-R, a magnetic tape, and a nonvolatile memory card, a ROM, etc.

The function of each of the above embodiments is realized when the computer reads and executes the program code. The present invention is found even when an operating system (OS) etc. that runs on the computer handles part or whole of actual processing in accordance with the instruction of the program code, and the function of each of the above embodiments is realized by that processing.

The present invention covers another embodiment in which the program code read out of the storage medium is written in a memory in a function enhancing board inserted into or a function enhancing unit connected with the computer. Then, a CPU etc. on the function enhancing board or the function enhancing unit handles part or all of actual processing in accordance with the instruction of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-154213, filed on Jul. 10, 2012, which is hereby incorporated by reference herein in its entirety.

What is claimed is:

1. An image-pickup apparatus comprising:
an image sensor configured to continuously capture an image at a predetermined cycle;
an accumulation time controller configured to control accumulation time of the image sensor;
an amplifier configured to amplify an image signal generated by the image sensor;
an object brightness calculator configured to calculate an object brightness based upon the image signal generated by the image sensor;
an exposure condition calculator configured to calculate an exposure condition of the image sensor which is determined by the accumulation time of the image sensor, an amplification amount and an aperture value of the image signal, based upon the object brightness calculated by the object brightness calculator; and
an image generator configured to synthesize a plurality of images continuously captured with a plurality of exposure conditions having different exposure values, to sequentially generate a synthesized image, and to generate a motion image including the synthesized images,
wherein the exposure condition calculator calculates the accumulation time so that the accumulation time increases as the object brightness increases, so as to follow a change of the object brightness,
wherein in a case that the accumulation time for the image to be captured reaches a settable upper limit value, the exposure condition calculator maintains the accumulation time of the image which has reached the upper limit value and increases the amplification amount so as to follow a change of the object brightness, wherein the settable upper limit value corresponds to the predetermined cycle, and
wherein in a case that the accumulation time for the image to be captured has not reached a settable upper limit value, the exposure condition calculator calculates the plurality of exposure conditions so as to follow the change of the object brightness using the accumulation time until the accumulation time for the image reaches the upper limit value.

2. The image-pickup apparatus according to claim 1, wherein each of the first and second values is higher than a threshold, and each of the third and fourth values is lower than the threshold, and
wherein the accumulation time calculated by the exposure condition calculator is equal to a predetermined cycle of the image sensor at the threshold.

3. The image-pickup apparatus according to claim 2, wherein the exposure condition calculator calculates the plurality of exposure conditions by maintaining the aperture value and the amplification amount in each of the plurality of images in following the change of the object brightness from the first value to the second value.

4. The image-pickup apparatus according to claim 1, wherein the exposure condition calculator changes the accumulation time so as to follow the change of the object brightness when none of the accumulation time used to obtain any one of the plurality of images reaches a settable upper limit value, and the accumulation time calculator calculates the plurality of exposure conditions so as to follow the change of the object brightness by increasing the amplification amount used to obtain the plurality of images and by maintaining the accumulation time used to obtain the plurality of images when the accumulation time used to obtain one of the plurality of images reaches the settable upper limit value.

5. An image-pickup apparatus comprising:
an image sensor configured to continuously capture an image at a predetermined cycle;
an accumulation time controller configured to control accumulation time of the image sensor;
an amplifier configured to amplify an image signal generated by the image sensor;
an object brightness calculator configured to calculate an object brightness based upon the image signal generated by the image sensor;
an exposure condition calculator configured to calculate an exposure condition of the image sensor which is determined by the accumulation time of the image sensor, an amplification amount and an aperture value of the image signal, based upon the object brightness calculated by the object brightness calculator; and
an image generator configured to synthesize a plurality of images continuously captured with a plurality of different exposure conditions, to sequentially generate a synthesized image, and to generate a motion image including the synthesized images,
wherein when the exposure condition used to obtain one of the plurality of the images reaches a settable upper limit value of the accumulation time and a settable upper limit value of the amplification amount in generating the synthesized image, the exposure condition calculator obtains one image corresponding to another image different from the one of the plurality of images, multiplies an obtained image by a coefficient corresponding to an output value of each pixel of the obtained image, and generates the synthesized image in which the dynamic range is expanded.

6. A control method for an image-pickup apparatus that includes an image sensor configured to continuously capture an image at a predetermined cycle, the control method comprising:
an object brightness calculating step of calculating an object brightness based upon the image signal generated by the image sensor;
an exposure condition calculating step of calculating an exposure condition of the image sensor which is determined by accumulation time of the image sensor, an amplification amount and an aperture value of the image signal, based upon the object brightness calculated by the object brightness calculating step; and
an image generating step of synthesizing a plurality of images continuously captured with a plurality of exposure conditions having different exposure values, of sequentially generating a synthesized image, and of generating a motion image including the synthesized images, wherein in the exposure condition calculation step, the accumulation time is calculated so that the accumulation time increases as the object brightness increases, so as to follow a change of the object brightness, wherein in a case that the accumulation time for the image to be captured reaches a settable upper limit value, the exposure condition calculator maintains the accumulation time of the image which has reached the upper limit value and increases the amplification amount so as to follow a change of the object brightness, wherein the settable upper limit value corresponds to the predetermined cycle, and wherein in a case that the accumulation time for the image to be captured has not reached a settable upper limit value, the exposure condition calculator calculates the plurality of exposure conditions so as to follow the change of the object brightness using the accumulation time until the accumulation time for the image reaches the upper limit value.

7. A non-transitory computer-readable storage medium configured to store a program that enables a computer to execute each step in the control method for the image-pickup apparatus according to claim 6.

8. The image-pickup apparatus according to claim 1, wherein the image generator generates a HDR image.

9. The image-pickup apparatus according to claim 1, wherein the image generator generates a synthesized image in which a dynamic range is expanded.

\* \* \* \* \*